April 20, 1954

M. WALLACE 2,676,316

PULSE TIME TELEMETRIC SYSTEM

Filed June 16, 1947

Inventor
MARCEL WALLACE
By Hyman Hurvitz
Attorney

Patented Apr. 20, 1954

2,676,316

UNITED STATES PATENT OFFICE 2,676,316

PULSE TIME TELEMETRIC SYSTEM

Marcel Wallace, East Port Chester, Conn., assignor, by mesne assignments, of one-half to said Wallace, doing business as Panoramic Laboratories, East Port Chester, Conn.

Application June 16, 1947, Serial No. 754,828

24 Claims. (Cl. 343—6)

This application is a continuation-in-part of applications for U. S. Patent No. 633,138 filed in the names of Wallace and Wu on December 6, 1945 now U. S. Patent 2,505,314 and of an application for U. S. patent entitled Telemetric Pulse Time Position Recorder filed in the name of M. Wallace on April 25, 1947 and identifiable as Serial No. 743,939, now U. S. Patent 2,534,841 and of a further application for U. S. patent entitled Altitude and Distance Recorder, filed in the name of M. Wallace concurrently with the present application, as Serial No. 754,941, now United States Patent #2,609,532, and of a further application for U. S. patent entitled Frequency and Pulse Time Modulation Telemetric System and filed concurrently herewith in the name of M. Wallace and identified as Serial No. 754,940.

The present invention relates generally to telemetric devices which are operative to transmit the values of a plurality of measurable quantities from each of one or more measuring and transmitting locations, in terms of pulse time position modulations of pulses which are in any event transmitted for purposes of distance measuring by means of radar equipments of the type which measure transmission times of radiant energy pulses as a measure of distance.

In the application for patent filed in the name of Wallace and Wu, referred to hereinbefore is disclosed a method and a system for transmitting pulses timed with respect to an arbitrary zero of time in accordance with a measurement of altitude, and a method and a system for interpreting the timing of the pulses at a remote location, and there indicating the values of altitude. While altitude representative transmissions are provided in the system, as disclosed, quite obviously the principles of the system are applicable to the transmission of values of any measurable quantity which may be translatable into an angular position of a pointer.

In my application for U. S. patent entitled Telemetric Pulse Time Recorder, and filed concurrently herewith, I disclose how a system of the general type disclosed in the Wallace-Wu application may be utilized in conjunction with a facsimile type recorder for recording the values of a plurality of measurable quantities, these values being transmitted from random locations as pulse time position modulations.

In my application for Altitude and Distance Recorder, filed concurrently herewith, I show how the normal pulse type distance measuring equipment may be adapted for telemetric recording in accordance with the principles of my invention in Telemetric Pulse Time Position Recorder.

In my application for U. S. patent entitled Frequency and Pulse Time Modulation Telemetric System, and filed concurrently herewith, I have shown how a recording of telemetric information of one character may be superimposed on a recording of telemetric information of another character, by utilization of the fact that in facsimile type recorders are normally provided two distinct time parameters, one represented by lateral scan of a record receiving surface and the other by timed feeding of the said surface. Specifically, and as one mode of application of the invention I telemetrically transmit altitudes of aircraft in terms of transmitted frequencies, which are recorded in a line extending generally longitudinally of a record receiving surface, and instantaneous values of altitudes being meaesured by the lateral positions of the recorded lines, and I superimpose modulations on the recorded lines at longitudinal positions representative of other quantities, such as range or azimuth, or both.

In the present application I improve the system disclosed in my application for U. S. patent entitled Altitude and Distance Recorder wherein substantially continuous recordings of the value of a measurable quantity are provided at lateral positions of a record receiving surface in accordance with pulse time position modulations, the pulses being utilized in measuring distance, in any event, by introducing into the system the principles of my application for U. S. patent entitled Frequency and Pulse Time Modulation Telemetric System, by superimposing on the record, longitudinally positioned modulations thereof, which represent in terms of their longitudinal positions the values of measurable quantities.

Broadly described, the present invention involves a pulse type radiant energy transmitter and receiver, which are utilized in conventional fashion for distance measuring by providing in conjunction therewith circuits and apparatus for measuring time elapse between pulse transmissions and pulse receptions, the elapse occurring by reason of time consumed by the radiant energy in traveling to a radio beacon, repeater or transponder, and to return to the receiver. Systems of the above briefly described character are well known under the descriptive style and name of "Radar," and require no extensive elucidation in the present application.

In distance measuring systems which operate on the principle of measuring travel time of pulses of electro-magnetic energy to a reflecting or transponding location and back to the source of energy, the precise times of occurrence of the transmitted pulses has not normally been a matter of importance, since only the time elapse between transmission and receptions has had significance in determining range or distance. In systems wherein a large number of measuring equipments of the pulse type have operated on the same or closely adjacent frequencies, and in a relatively restricted area, it has in fact become a conventional practice to transmit from each of the equipments at random, to avoid or to minimize the possibility of interference between distinct equipments.

At the present time a type of distance measuring system which has received the approval of the Civil Aeronautics Authority, for determining the distance of aircraft from a transponder or repeater station located at an airport or other fixed location, provides for the transmission from each of a plurality of aircraft of pulses at random times and with random spacings, both with respect to the transmissions from any one aircraft, and with respect to the transmissions from the various aircraft considered as a group. The reason for the random character of the transmissions is, as has hereinbefore been indicated, to avoid or to minimize the possibility of interference between measuring equipments, all of which receive signals from the same transponder. The receiver of each of the distance measuring equipments is gated to enable reception of pulses only during times after pulse transmissions which correspond to the range which the equipment is momentarily measuring. By causing the average time between transmitted pulses in a given equipment to be large relative to the time the receiver of that equipment is gated open, the majority of pulses transmitted from adjacent equipments are not effective with respect to the given equipment, and those which do escape past the time gate, due to their random occurrence, have negligible effect on the range measurement.

It is my conception that the times or time positions of transmission of pulses emitted by the pulse type distance measuring equipment above briefly described, may be controlled in accordance with the value of a measurable quantity, without destroying, or, in fact, affecting in any way, the advantages and mode of performance of the distance measuring equipment. The time positions of the emitted pulses from any desired number of pulse transmitters may be translated at an indicating or recording station, remote from the several pulse transmitters, in terms of the values of the measurable quantity, providing at the station continuous indications, in transient or permanent form, of the values of the quantity.

More specifically, I desire to apply my invention to the transmission of altitude information from a plurality of aircraft, by means of time position modulation of the pulses which are transmitted by the craft in the process of obtaining distance measurements.

In order to make effective application of a system of pulse timing modulation for telemetric purposes, a reference time must be provided, as well as a reference time scale, which are common to the entire system, so that the time positions of pulses transmitted by various transmitters to represent various telemetric values, shall be translatable or interpretable in terms of a common reference time and time scale. Since it is expected that substantially all airports will, in the course of time, and in accordance with the requirements of the Civil Aeronautics Authority, be provided with omni-directional beacon systems, and since such systems provide transmissions at a fixed frequency and at a constant phase, I prefer to utilize these transmissions to provide the required time scale, as well as the required zeros of time. It will be understood, however, that such utilization of transmissions which are in any event available, involves merely a matter of convenience, and that a time scale and zero time references for the system of the invention may be provided in other ways.

I have discussed hereinbefore the concept of impressed time position modulations on pulses which are transmitted in any event for the purpose of making distance measurements. The function of translating or interpreting the modulated pulses may be accomplished by means of a line scanning recorder, of the type now quite common and well known in connection with facsimile recording, and having a helical platen which scans, by virtue of a rotary motion imparted thereto, laterally of a time-fed record receiving surface, in synchronism with the pulse transmissions, each possible time position of the transmitted pulses bearing a definite and invariable correspondence with a recording position on a line extending laterally across the record receiving surface.

It will be realized, when the mode of operation of the now conventional line scanning facsimile type recorder is considered, that two time representative axes or references are provided thereby. The first represents a lateral scan of a record receiving surface, which I propose to utilize for measuring altitude, although obviously any other quantity might be telemetrically recorded in place of altitude without departing from the spirit of the invention. The second axis or reference is the longitudinal motion or feed of the record receiving surface past the line scanning mechanism.

I provide on the record receiving surface successive zero time markers, the time elapse between which is representative of a measuring cycle devoted to the determination of times of modulation of the pulse time positions of the transmitted pulses, either by omitting pulses or series of pulses or by displacing the times of pulses or series of pulses. The times of occurrence of the modulations of pulse time positions which are representative of a first quantity may be controlled in accordance with values of further quantities, and the values of these quantities may be read on the record of values of the first quantity by measuring the locations of modulations of the record produced thereby. By this means I may provide for the transmissions of the values of a considerable number of distinct quantities by timing of pulse positions, without time sharing or time division multiplexing, and I provide for recording of the values by means of a relatively simple facsimile type recording apparatus, which requires but slight modification to adapt it to the present system. At the same time the system of the present invention does not interfere in any deleterious manner with the normal function and operation of the distance measuring equipment which is utilized for generating the modulated pulses.

Accordingly, it is an object of the present invention to provide a telemetric system of the type utilizing pulse time modulation.

It is a further object of the invention to provide an improved pulse type distance measuring system, wherein the time positions of pulses otherwise transmitted for the purpose of measuring distance provide a measure of the value of a measurable quantity, and wherein the transmitted pulses may be further modulated in accordance with the value of a further measurable quantity.

It is still a further object of the present invention to provide an improved pulse type distance measuring equipment wherein the timing of transmitted pulses is controlled in accordance with the value of a measurable quantity, and wherein the said pulses are subjected to modulation at timed intervals determined in accordance with one or more further quantities.

It is another object of the present invention to provide a telemetric recording system for recording laterally of time fed receiving surface time positions of transmitted pulses, and wherein longitudinal modulations of the lateral record are provided to represent the values of further quantities.

It is a further object of the present invention to provide a pulse type distance measuring equipment modified to cooperate with a telemetric recorder, without deleterious effect to the normal function of the equipment, by controlling the time position of each transmitted pulse in accordance with values of a first meausrable quantity, and by modulating certain only of the transmitted pulses selected in accordance with the values of one or more further measurable quantities.

More specifically stated, it is an object of the present invention to provide a system of pulse type distance measuring equipments, each located on a different elevated object, and all operating in conjunction with a single and the same radar beacon or transponder to determine range with respect thereto, and wherein the timing of the transmitted pulses from each of the equipments is determined with respect to an arbitrarily determined zero of time and a time scale, common to the entire system, in accordance with the altitude of the associated elevated object, and wherein, further, certain pulses are selected for modulation or timing deviation in accordance with the value of the range or the azimuth of the object, or both, which determine times measured with respect to a further arbitrary zero of time, and a time scale, common to the entire system.

It is an object of the invention, further, in conjunction with the last mentioned object, to provide a central recorder for recording altitudes of the various objects in terms of lateral positions of longitudinally extending time records, individual to the various craft, and for recording the values of range, or azimuth, or both in terms of modulations or temporary lateral deviations of the time records, at longitudinal positions along the time records corresponding with the measured values of range, or azimuth, or both, time scales being established for lateral scanning of a record receiving surface and for time feeding thereof, in precise correspondence with the time scales utilized in determining pulse time positions representative of altitude, and modulation times representative of azimuth, or range, or both.

The above and still further objects, advantages and features of the present invention will become evident upon consideration of the following detailed description of one specific embodiment thereof, especially when taken in conjunction with the accompanying drawings, wherein:

Figure 3 is a plan view of a record receiving surface having thereon records provided in accordance with the invention;

Figure 1:
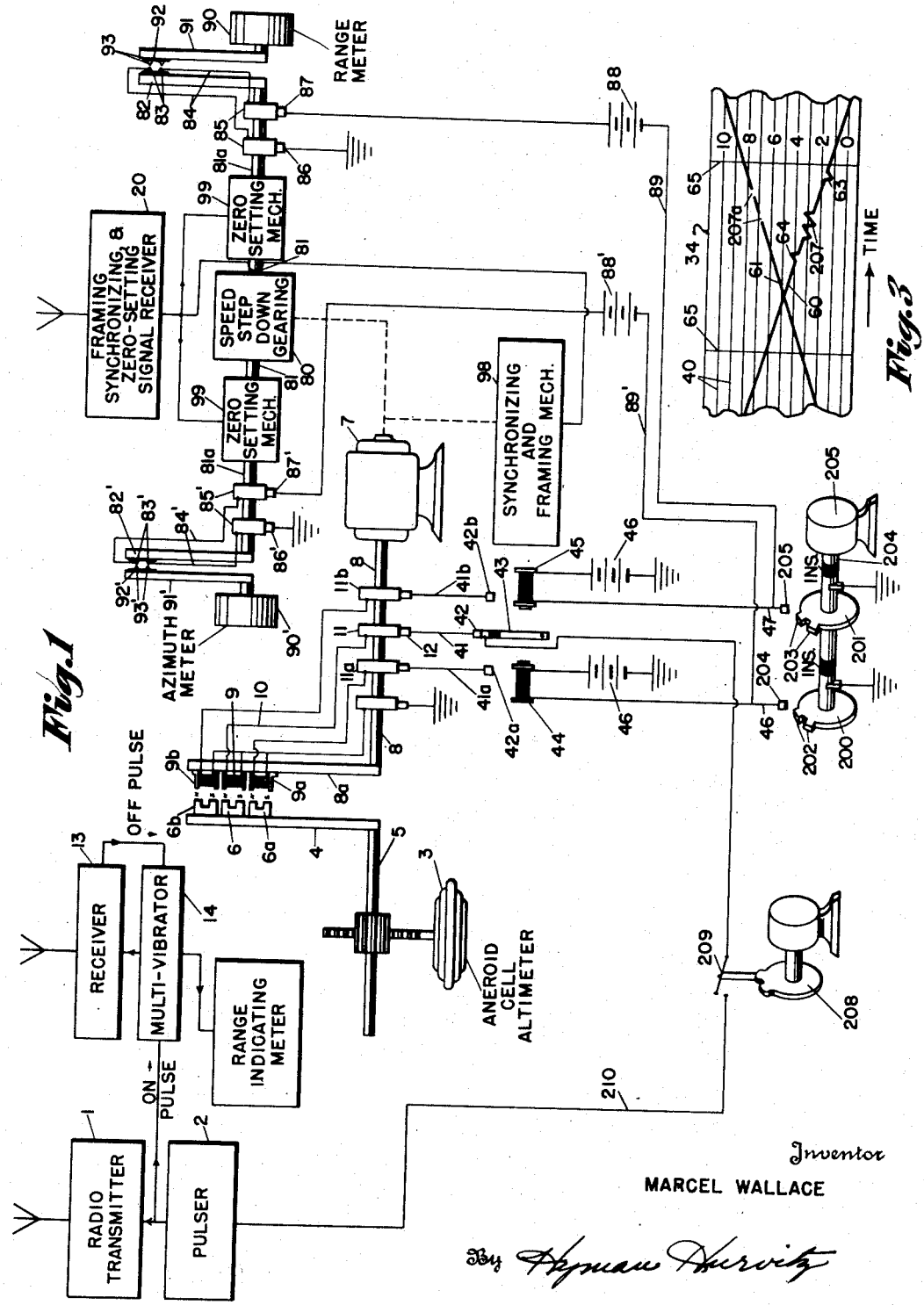
Figure 1 is a circuit diagram, and a conventionalized mechanical drawing, partly schematic and partly in functional blocks, of apparatus required at each telemetric transmitting station, in the system of the present invention.

Referring now more specifically to the drawings, the reference numeral 1 denotes a radio transmitter, which operates at any convenient and constant frequency, say 150 mc., for purposes of example. The transmitter 1 is associated with a pulser 2, which serves to energize the transmitter 1 to transmit short pulses or bursts of radio frequency energy in response to each control pulse applied to the pulser. Control pulses for the pulser 2 are developed by means of an equipment of the type disclosed in the aforementioned application for U. S. patent, Serial No. 633,138, filed on December 6, 1945, in the names of Wallace and Wu, and comprises an altimeter 3 of the aneroid cell type which serves to position an angularly positionable pointer 4, about a pivot 5, causing the pointer 4 to assume an angular position corresponding with and determined by the altitude measured by the altimeter 3. Secured to the pointer 4 in any convenient fashion is a small permanent magnet 6. A synchronous motor 7 drives a shaft 8, which is aligned with the pivot 5, and to which is secured an arm 8a having at one end a pick-up coil 9, which is rotated as the shaft 8 and arm 8a turn, in a path immediately adjacent the locus of possible positions of the magnet 6. Upon each passage of the pick-up coil 9 past the magnet 6 there is induced in the coil 9 a voltage, by virtue of the operation of Faraday's law. This voltage is conveyed by means of lead 10 from the coil 9 to a slip ring 11 secured to the shaft 8, and thence to a brush 12, leads from which extend to the pulser 2, and apply to the pulser 2 for control purposes the voltages induced in the coil 9.

The equipment and apparatus described in the preceding two paragraphs may be briefly described as an altitude time pulse transmitter, and will be so referred to hereinafter, since its function is to provide pulses or brief bursts of radio frequency energy at times, with respect to an arbitrary time scale determined and defined by the rotation of the synchronous motor 7, which depend upon the reading of the aneroid cell altimeter 3 and hence upon altitude.

We may assume that a plurality of the altitude timed pulse transmitters hereinbefore described are mounted each in a different aircraft, and that the synchronous motors 7 aboard all the aircraft are constrained to operate at a precisely common frequency, and with a precisely common phase or framing, by means which will be described in detail hereinafter. Under such conditions the various aircraft will transmit periodic pulses, all at a common repetition rate, and all timed with respect to the same arbitrary zero of time and with respect to the same time scale, but the pulse transmissions from each of the aircraft having time positions, or phases, which are determined by the instantaneous altitude of the aircraft.

There has been discussed hereinbefore quite briefly the theory of operation of the pulse transmission type of distance measuring equipment, wherein pulses are transmitted at random from transmitters aboard each of a plurality of aircraft, and are repeated from a common transponder located at a ground station, usually at a significant location such as an airport or an aircraft carrier, and wherein the time required for transmission of the pulses to the transponder and back to a receiver associated with the transmitter is measured to determine range. It has been explained that the random character of the transmitted pulses is enforced for the purpose of minimizing interference between aircraft which are transmitting and receiving contemporaneously. While this random operation of the distance measuring equipment has been considered essential heretofore, it is rather non-simultaneous transmissions which are essential, and these may be provided as among a plurality of transmitters by what may be described as an ordered randomness, as distinguishable from a purely chance randomness, without loss of any of the benefits of the latter.

More specifically I propose to utilize the transmitter 1 as the interrogator of a pulse type distance measuring equipment, which is in essence merely an interrogator-responsor. Thereby each aircraft is constrained to transmit pulses at the same repetition rate, but at time positions corresponding with altitude, so that aircraft flying at even slightly distinct and different altitudes are incapable of simultaneous transmissions. An ordered randsomness is introduced into the transmissions of the interrogators of the distance measuring equipment which serves to prevent interference between transmissions from distinct aircraft with the same effectiveness as has been the case hitherto by transmission at chance random.

The control of pulse timing in the interrogators of the present system in accordance with the value of a variable parameter, for example altitude, enables determination at remote stations of the values of said parameter as associated with each of the transmitting aircraft, and in accordance with the principles and apparatus disclosed in co-pending application of M. Wallace, Serial No. 743,949, filed April 25, 1947, and entitled Telemetric Pulse Time Position Recorder, of which this application is a continuation-in-part, the values of said parameter may also be recorded in permanent form on a time fed and time calibrated record receiving surface or strip.

Disregarding for the immediate present the distance measuring function of the airborne equipment of the present system, and turning our attention to the ground recording station, there is provided a pulse receiver 30, arranged to receive and demodulate pulse signals of the character of those transmitted by the airborne transmitters or interrogators of the system. Detected pulses provided by the receiver 30 are applied, after amplification, if required, to the marker electrode 31 of a facsimile type recorder 32, having a helical platen 33 and a time fed record receiving surface 34. The specific character and structure of the recorder 32 forms no port of the present invention, and I may utilize various recorders of the type indicated, such recorders being available for purchase commercially and having been the subject of the grant of a considerable number of Letters Patent of the United States. I specify, however, that a recorder of the type disclosed in U. S. Patent #2,215,806, issued to C. J. Young and dated September 24, 1940, is satisfactory for the purpose in hand, and make reference to that patent for a full and complete disclosure of a suitable recording mechanism. Suffice it to state in the present application, that marks are created on the surface 34 upon application to the marker 31 of a sufficient voltage, the lateral position of the mark being determined by the instantaneous position of the helical platen at the instant of application of the said voltage. The platen 33 of the recorder 32 is rotated by means of a synchronous motor 35 at the same speed and with the same framing phase as are the various synchronous motors 7, located at the telemetric transmitters of the system, and which cause rotation of pulse generating pick-up coils 9. In order to assure that the synchronous motor 35 and the various synchronous motors 7 shall be synchronized and identically framed, the motor 35 is utilized to control a sync signal generator 36, which supplies its output to a radio transmitter 37 tuned to transmit on the frequency to which are tuned sync signal receivers 29, located at the telemetric transmitting stations of the system. The specific structure and mode of operation of the sync signal generating equipment provided at the receiving and recording station of the present system forms no part of the invention, it being sufficient that signals be provided which are of suitable character to cooperate with the synchronizing and framing equipment 98 at the various telemetric transmitters, to assure that the motors 7 will maintain precise framing and synchronization with respect to the motor 35. Many such synchronizing and framing systems are available in the prior art, and I do not desire to be restricted to any particular one of such systems. I have, however, specified one specific system which I prefer to employ, a full description of which, both in respect to structure and mode of operation, is to be found in Letters Patent of the United States, No. 2,263,641, to Nicholson.

A further signal which may be utilized for synchronizing in the present system, as has been briefly indicated hereinefore, is the omni-directional beacon system of the type approved by Civil Aeronautics Authority for installation generally at airports. This system operates by transmitting a rotating pattern of energy and a fixed pattern of omni-directional energy, the speed of rotation of the rotating pattern being related in frequency to a modulation frequency of 30 cycles per second, impressed on the omni-directional transmission. The 30 cycle signal provides a convenient synchronizing signal, and may be employed to drive all the synchronous motors 7 and 35 of the present system at identical speeds. Suitable framing signals may be superimposed on the 30 cycle modulation.

Suffice it to state that while various synchronizing and framing systems may be utilized in conjunction with the present system, as above indicated, I do not consider the use of any specific such system to be essential, and the various systems suggested are intended for purposes of exemplification only.

By virtue of the dentical framing and rotative speed of the recorder motor 35 and of the telemetric transmitter motors 7, a common zero of time may be provided for all the equipment of the present system, and the coil supporting arms 8a as well as the helical platen 33 may so be arranged that upon passage of the coils 9 adjaent a meter position corresponding with zero value of the measured quantity, or of zero angular displacement of the meter pointer 4, the helical platen 33 shall be so phased as to be potentially able to create a mark on the record receiving surface 34 at a point corresponding with a zero calibration line antecedently provided on the surface. The record receiving surface may be calibrated laterally, by means of laterally spaced, parallel lines 40, provided thereon (see Figure 3) to enable determination of the value of any mark created on the paper. The total lateral dimension of the record receiving surface 34, or any predetermined portion thereof, may be caused to correspond with the total possible angular displacement of the pointer 4 of the aneroid cell 3 and the total altitude range of the system.

It will be recalled that the transmitter 1 performs its primary function as an interrogator of an interrogator-responsor or distance measuring equipment. The responsor of the distance measuring equipment comprises a receiver 13 which is normally inoperative, but which is keyed to operative condition instantaneously in response to the output of a multivibrator or square wave generator 14, operation of which is initiated in response to each transmitted pulse, the square wave generator operating to provide a sensitizing or gain control voltage to the receiver 13 soon after application thereto of the control pulse derived from the pulser 2. The multivibrator is of the type well known, per se, which maintains its condition, once it has been established, until a further control pulse is applied thereto, at which time it returns to its original position. In the present application the "off" pulse is applied to the multivibrator 14 from the receiver 13 itself, in response to a received or transponded pulse, and in the "off" position the sensitivity of the receiver is again reduced to a low value. It will thus be evident that time gating is applied to the receiver 13, which is effectively switched on in response to each transmitted pulse and off in response to each received pulse, remaining thereafter in off position until the occurrence of a further transmitted pulse. The receiver 13 may be rendered inoperative during transmission by transmitter 1 in accordance with known techniques.

The time between successive pulses is chosen to be large in relation to the time of propagation of electro-magnetic energy for the maximum intended range of the equipment, by a factor of the order of 100 to 1000, so that there is in effect a time sharing as between various aircraft of the system for range measuring purposes.

Range at any one aircraft may be measured in terms of the total operating time of the multivibrator 14, which in turn determines the average of certain currents or voltages of the multi-vibrator, in a manner which is well known per se, these currents or voltages being measurable by means of a voltmeter or ammeter to determine range or distance.

The specific character of the distance measuring equipment utilized in my invention is per se well known, and is subject to modification in detail, in any event, and it is, accordingly, deemed unnecessary to complicate the description and illustration of the present system with a full and complete circuit diagram and exposition thereof. I have, accordingly, disclosed and described same only to the extent required to enable those skilled in the art to understand the principles and mode of operation of my invention.

Reference is made to Figure 3 of the drawings for an illustration of the appearance of a record as provided by the apparatus of the invention, as so far described. The arrow labelled "time" represents the longitudinal direction of feed of record receiving surface 34 with time, the lines 60 and 61 representing time records of aircraft altitude.

It will be realized that the transmitting equipments built in accordance with the present invention transmit atmospheric pressure, rather than true altitude, so that for a given altitude times of transmissions from the various aircraft of the system may vary from day to day or from hour to hour, in accordance with the value of ambient pressure temporarily existing in a given area. To overcome this difficulty, the calibration provided on the record receiving surface 34 may be provided under control of the value of local atmospheric pressure existing on the ground. There is thereby provided an automatic correction for variations in local atmospheric pressure, since the value of each altitude record may be referred to a corrected calibration mark. Specifically, I provide at the ground station an altitude timed pulse transmitter 28, similar to that provided on the various aircraft of the system, for generating a control pulse timed, with respect to the arbitrary zero of time of the system, to correspond with sea level altitude for standard conditions of atmospheric pressure. The pulse transmitter 28 synchronizes a frequency multiplying oscillator of the multi-vibrator type 29, which provides a number of output pulses, equally spaced, for each control pulse inserted therein. The pulses provided by the multi-vibrator are so spaced that when applied to the recorder 32, properly spaced calibration lines are recorded on the record receiving surface 34, the pulse frequency of the multi-vibrator 29 being fixed and the pulse separation being properly chosen for that purpose. The phasing or time positioning of the pulses are determined, however, by the pulse timing of the pulse output of the transmitter 28, the latter being determined in part by local atmospheric conditions, the calibration lines varying in lateral position on the surface 34, all simultaneously, in accordance with such conditions. Examples of suitable calibration lines 40 are provided in Figure 3, the position of the lines with respect to the edges of the surface 34 being of significance primarily in determining the existence of variations of atmospheric pressure from standard conditions.

In accordance with the system of the present invention, all the aircraft as well as the ground station, may utilize aneroid altimeters pre-calibrated for standard atmospheric conditions, and proper and correct readings of altitude will be provided at various recording stations, or at the same recording station at various times, without introducing altitude corrections into the altimeters on the various aircraft.

To this point the system disclosed corresponds in general with that disclosed in my co-pending application, entitled Altitude and Distance Recorder, filed concurrently herewith. The respect in which the present application distinguishes from the latter will now be described, including the apparatus utilized for adding to the altitude representative records indications of azimuth and range, as well as a preferred manner of identifying the various records and relating same to the originating craft.

The various altitude lines recorded at the recording station, and each originating from a distinct aircraft, may be identified, in a preferred manner, by periodically retarding or advancing, or both, in coded sequence, the time positions of pulses transmitted for representation of altitudes, or by interrupting transmissions in coded sequence. Since each aircraft utilizing the present system may be provided with a distinct coding sequence individual to that craft, the altitude records may be each identified in terms of the originating craft.

As still a further, and extremely valuable function, the altitude representative records may be further modulated in a manner significant of the values of measurable quantities, in addition to altitude. This function may be accomplished by utilizing the time scale inherently provided by the longitudinal feed of record receiving surface 34, as a scale of measurement against which may be compared the positions of one or more pointers. Specifically I synchronize the movement of the surface 34 with the movement of one or more space scanning members, which scan the locus of positions of one or more pointers, the position of each pointer being representative of a measured value or quantity. Upon concurrence or coincidence of the positions of a scanning member with a pointer position, a modulation is effected, altitude representative transmission is effected, which causes a corresponding modulation of the altitude representative record at the recording station. I prefer to modulate the altitude representative transmission by retarding or advancing temporarily the time positions of the transmitted pulses, which produces a corresponding deviation in the altitude record.

By examining any altitude representative record, and observing the location and character or lateral deviations thereof, the values of the telemetric quantities which are transmitted as supplementary to altitude may be determined. That these quantities may be azimuth and range has been suggested hereinbefore, but it will be clear that the values of any desired quantities may be substituted for the suggested quantities, without departing from the scope of the invention.

Referring again to Figure 1 of the drawings, the arm 8a, which supports for rotary motion the pick-up coil 9 is provided with two further pick-up coils 9a and 9b, the former of which is advanced slightly in phase position with respect to coil 9, and the latter of which is retarded slightly in phase position with respect to coil 9. The magnet 6 is made of sufficient length to provide magnetic flux linkages with all of coils 9, 9a and 9b, or alternatively is supplemented by additional magnets 6a and 6b, positioned on the same radius as is magnet 6, for such purpose. One terminal of each of coils 9, 9a and 9b is connected in common to a grounded slip ring 40. The remaining terminals of coils 9, 9a and 9b respectively are connected with slip rings 11, 11a, and 11b respectively, which are electrically coupled to leads 41, 41a and 41b respectively, over suitable brushes. The leads 41, 41a and 41b are connected with contacts 42, 42a and 42b of a three position selective switch, having a selector arm 43, which is electrically connected with pulser 2.

The position of selector arm 43 determines which one of coils 9, 9a and 9b shall be connected with pulser 2 to determine the time positions of pulses transmitted by transmitter 1, coil 9 being the coil normally so connected for transmission of altitude representative signals. By substituting coils 9a or 9b for coil 9, it is possible to advance slightly or to retard slightly, the normal time positions of altitude representative pulses, a fact which is utilized for transmitting telemetric signals supplementary to the altitude representative signals.

The selection of contact points 42, 42a, 42b by switch arm 43 is accomplished by means of electro-magnets 44 and 45, the former of which, when energized pulls arm 43 into contact with point 42a, and the latter of which pulls arm 43 into contact with point 42b. When magnets 44 and 45 are both de-energized, the arm 43 remains in contact with switch point 42.

Upon temporary connection of coil 9a in circuit with pulser 2, in response to operation of relay 44, a slight lead or advance in timing is introduced into the altitude representative pulses, and upon temporary connection of coil 9b in circuit with pulser 2, in response to operation of relay 45, a slight delay or retardation is introduced into the timing of the altitude representative pulses as provided in response to signals generated in coil 9. Upon consideration of the structure and mode of operation of the recording device of Figure 2 of the drawings, it will be evident that corresponding slight deviations of altitude representative recorded lines, may be caused to occur in the record provided by the recorder R.

Referring to Figure 3, wherein is illustrated in plan view, a longitudinally extending portion of the record receiving surface 34, there is shown a pair of discrete altitude representative records 60 and 61, which may be interpreted by comparison with altitude calibration lines 40, to provide a time record of altitudes of each of a pair of aircraft. Laterally deviated portions of line 60, denoted 63 and 64, are shown to illustrate responses, respectively, of the recorder R to transient energization of magnets 44 and 45, deviation 64 representing a transient advance of pulse timing and deviation 63 a transient retardation of pulse timing. It is intended that the timing of deviations 63 and 64, respectively, as represented by their longitudinal positions, on surface 34, with respect to an arbitrary starting or reference line 65, shall represent the values of measurable quantities, which in the presently preferred embodiment and application of the invention, may correspond with the range and azimuthal bearing of the transmitter 1 with respect to a ground located beacon system (not shown).

An initial or zero reference line or starting position 65 may be impressed on the record receiving surface 34 by applying to the marker element 31 at definite times, and hence at definite space intervals on the surface, a recording potential of duration equal to one or several scanning cycles of helical platen 33. To provide zero reference lines 65 at definite positions on the surface 34 and also at definitely spaced time intervals, I secure to the drive means 66 for the take up roll 67 of the record receiving surface 34 a timing cam 68, which operates for each complete rotation of take up roll 67 to close a circuit maker and breaker 68' the latter serving, when closed, to energize a sync pulse generator 69. The latter provides recording signal to marker element 31 over leads 69a and 69b, of sufficient duration to enforce a line, as 65, completely across the surface 34.

The cam 68 may be driven quite slowly, say at one revolution in each 30 seconds, which may correspond with three inches of paper feed, in presently conventional facsimile recorders. I may obviously utilize basic time intervals which are shorter or longer than 30 seconds, if desired, the latter being merely one example of a convenient value, which will be utilized in what follows, for the sake of convenience. The signal impulses provided by generator 69 may be of square wave, D. C. character and may be further utilized to key on a sync signal generator 69c, which in response to each output pulse from sync pulser 69, provides a plurality of cycles of modulating current at frequency $f_1$ to the sync signal transmitter 37, for transmission to the various telemetric transmitters of the system, there to be utilized for framing purposes, as will hereinafter appear.

The transmitter 37 operates at an allocated frequency different from that utilized for transmission of altitude representative signals and is utilized for transmitting not only the signals deriving from sync signal generator 69c, but also those deriving from sync and frame signal generator 36, which serves to synchronize and frame the various synchronous motors 7 of the present system. For this purpose the signals deriving from generators 36 and 69c must be of differentiable character and may preferably be of different frequencies.

Figure 2:
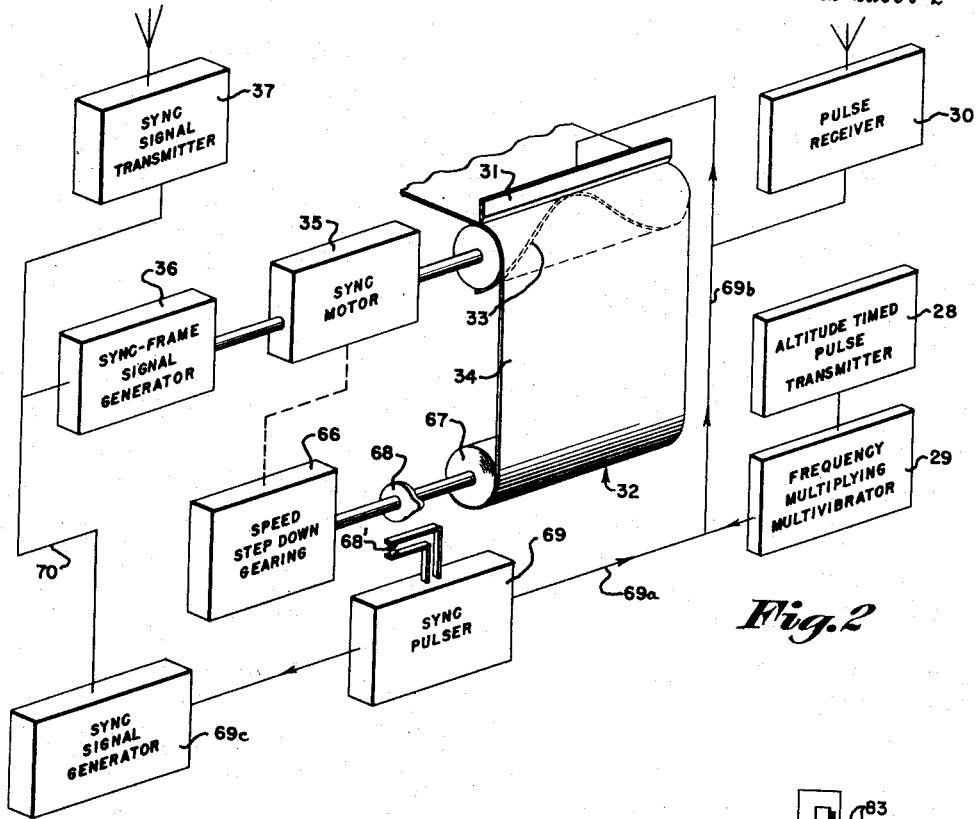
Figure 2 is a circuit diagram, in functional block diagram, together with a conventionalized showing of a facsimile type recorder, in accordance with the invention.

Returning now to the transmitting equipment of Figure 1 of the drawings there is provided a drive 80, comprising a speed change gearing driven from synchronous motor 7, which steps down the speed of motor 7, to that of take up roll 67 (Figure 2), the change gears 66 of Figure 2 being identical with gears 80 of Figure 1.

Framing and synchronizing of motors 7 of the system with respect to motor 35 (Figure 2), has been explained hereinbefore. Synchronizing of motors 7 with motor 35 serves also to synchronize the rotative velocity of drive 66 with the rotative velocity of drive 80, but does not serve to frame the drives 80.

The framing problem as between drive 66 of Figure 2 and drive 80 of Figure 1 arises since any one of the transmitting equipments of the present system may initiate operation at a random time. Once a condition of synchronism and proper framing has been attained between the two drives, that condition would, under ideal conditions of operation be retained, but temporary shut-down of the transmitter or temporary loss of synchronism between the motors 7 and a motor 35, will introduce a failure of framing of the drives 66 and 80.

The method by which the framing problem is overcome will be described in detail hereinafter, and the necessity for such framing will become apparent as the description proceeds. Assuming for the present, nevertheless, that the drives 66 and 80 are relatively synchronized and framed, and considering Figure 1 of the drawings, the drive 80 actuates a pair of shafts 81 to each of which is secured one of radial arms 82, 82'. Secured to one of the arms, 82, in electrically insulated relation thereto, is a pair of sharp metallic projections 83, connected electrically by means of leads 84, with slip rings 85 mounted on the shafts 81. One of the rings is grounded over a brush 86, the other being connected by means of a brush 87 in series with a source of voltage 88, and over a lead 89 to relay 45. A meter 90, which comprises part of a distance measuring equipment (not shown), positions a pointer 91, in accordance with range measurements taken with respect to the beacon system hereinbefore referred to. Secured to the pointer 91 is a small strip of insulating material 92, to which is secured a pair of sharp projections 93. The projections 83 and the projections 93 are arranged to be in radial alignment, when the arm 82 and the arm 91 are in angular alignment, but to be just barely out of contact. The potential of source 88 is sufficiently high to assure that when projections 83 and 93 are precisely in alignment a spark will pass between the upper projections and between the lower projections, completing the circuit to the relay 45.

From the above description it will be clear that as the arm 82 rotates, at a rate of 1 revolution in each 30 seconds, the relay 45 will be operated once in each cycle of rotation, and at a time determined by the angular position of pointer 91, which corresponds with a range reading of instrument 90.

Since the record receiving surface has been feeding in synchronism with the progress of arm 82, and keeping in view the fact that energization of relay 44 or 45 causes a temporary shift in pulse timing, it will be clear that a slight jog in altitude record will be produced at a longitudinal position along the record receiving surface 34 which corresponds with measured range. If line 60 in Figure 3 corresponds with the time record of altitude of transmitter 1 the mark 63 is made at a distance from initial line 65 corresponding with the distance or range of transmitter 1 with respect to the referred to beacon or transponder (not shown). Since the longitudinal distance between initial line 65 and a succeeding such line 65 corresponds with the known maximum range of which meter 90 is susceptible, a simple measurement of distance along strip 34 is sufficient to determine the significance of deviation 63, in terms of range.

The mechanism for actuating relay 44, for producing a deviation 64 (Figure 3) is precisely similar in all respects to that hereinbefore described in connection with the description of the production of deviation 63, except in that measurements are provided by means of an azimuth reading meter 90', which may derive its indications from an instrument (not shown) for determining bearings from transmissions provided by an omnidirectional beacon of the general type now approved by the Civil Aeronautics Authority, or in any other preferred manner. The meter 90' and its associated apparatus provides energizing signal to relay 44 over lead 89', at times representative of measured azimuths, and energization of relay 44 ultimately provides deviations 64 on altitude representative record 60, which are oppositely directed, and hence readily distinguishable, from the deviations 63.

I return now to a discussion of the framing means for assuring that the space scanning members 82 initiate space scanning cycles simultaneously with production of initial line 65 on the record receiving surface 34, so that the longitudinal positions of deviations such as 63 and 64 (Figure 3) shall have telemetric significance.

In Figure 1 of the drawings the blocks labelled 99 may represent any synchronizing or zeroizing system available in the art, and many such systems are available, one example of which, which I may utilize, being disclosed in U. S. Patent #2,005,158 issued to Nicolson, June 18, 1935. I prefer, however, to utilize the simplified synchronizing system illustrated in Figure 4 of the accompanying drawings, which is particularly adaptable to use in the telemetric system of the present invention.

Figure 4:
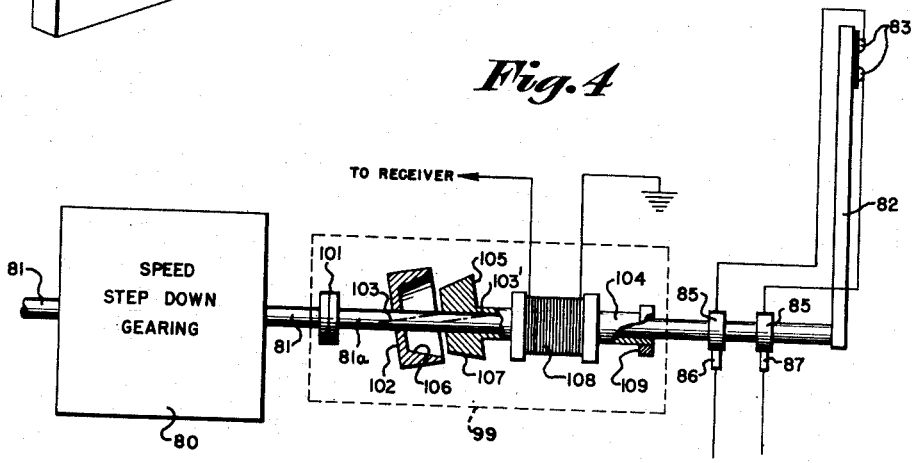
Figure 4 is a view in elevation of a zero-setting or framing mechanism utilized in the practice of the invention.

Referring to Figure 4 of the drawings there is illustrated the shaft 81 issuing from the speed step down gearing 80, and which is driven from the speed step down gearing 80 at a fixed speed, which, as has been hereinbefore suggested, may equal 1 revolution in 30 seconds. The shaft 81 drives a further colinear shaft 81a, to which is secured arm 82 via a friction clutch 101, so that while shaft 81a is normally driven by shaft 81 at the same rate of speed as the latter, the possibility exists of displacing shaft 81a rotatively with respect to shaft 81, for framing purposes. To the shaft 81a is secured a hollow cone 102, the axis 103 of which is not in alignment with the shaft 81a, but departs from such alignment by an angle of perhaps 10°. A further shaft 104 is provided, which is hollow and co-axial with the shaft 81a, but is of relatively short length. The shaft 104 has secured thereto a hollow cone 105, adapted to mesh with the cone 102 and the axis of which 103' makes the identical angle with respect to shaft 104 that exists between the axis 103 of cone 102 and the axis of shaft 81a. The shaft 104 is arranged to be irrotatable, but to be translatable along the shaft 81a, and is further arranged to have its inner conical surface 106 normally out of contact with the outer conical surface 107 of the cone 105 by a sufficient distance, to assure that during a full rotation of cone 102 no contact exists between it and cone 105 despite the relatively great eccentricity existing between axis 103 and to axis 103' during most of the rotation of shaft 81a.

Surrounding the hollow shaft 104 is a solenoid 108, and secured to the shaft 104 is an annular ring of magnetic material 109, which may be attracted by solenoid 108 when the latter is energized, thus to translate shaft 104 to the left, as seen in Figure 4, and causing meshing of cones 102 and 105.

The solenoid 108 is energized in response to pulses derived from the sync pulser 69 (Figure 2), such pulses occurring once in each 30 seconds. The cones 102 and 105 are adapted to mesh completely in only one relative angular position thereof, and the outer surface 107 of cone 105 and the inner surface 106 of cone 102 are made sufficiently smooth and frictionless so that if in response to actuation by solenoid 108 the cone 105 is driven internally of cone 102 and into contact therewith, while the cones 102 and 105 are not in the said one angular position, a camming action occurs, the friction clutch 101 slipping, and the cone 102 rotating until it is in complete mesh with cone 105.

The cones 102 and 105 are initially aligned relatively to one another, and to the position of the arm 82, so that in the position of complete mesh the arm 82 is in the proper angular relation for initiation of a cycle of scan of the locus of possible positions of the pointer 82.

In normal operation only very slight camming action is required in response to each zero-setting or framing action of the apparatus, since drive 80 may be depended on to have but very slight, if any, angular drift in the time required for a single revolution of shaft 81a. Upon initiating operation of an airborne equipment, or after a temporary interruption of operation thereof, however, the shaft 81a may be at random position, and a considerable camming action may be required to zero set same. Since the camming action endures only during reception of sync pulses, there may be available insufficient cam-pulses, there may be available insufficient camming time to accomplish complete framing in a single operation. This in itself is not serious, since framing may take place in a plurality of steps, without detriment except to the accuracy of the first few telemetric transmissions. The blocks 99 represent mechanisms responsive to the output of receiver 20 for zero-setting the scanning arms 82, 82', and since two distinct framing operations are required in the present system, one for framing synchronous motor 7, and another for framing or zero-setting scanning arms 82, the receiver 20 is provided with suitable circuits (not shown) for detecting and separating the different signals, distinguishable in terms of their frequencies, and originating in sync signal generators 36 and 69c, respectively, and for applying the different signals to the proper framing mechanisms, 98 and 99 respectively.

The apparatus as described hereinbefore requires one additional desirable element, that is, a means of identifying each aircraft of the system with a particular record. To accomplish this I utilize a pair of metallic code wheels 200 and 201, which are permanently grounded, and which comprise circumferential raised portions 202 and 203, respectively. The wheels 200 and 201 are driven from a common drive shaft 204, actuated by a clock mechanism 205. The clock 205 drives the wheels 200 and 201 at a rate of approximately, but not precisely, one revolution in each thirty seconds, so that rotation of clock 205 is not quite synchronized with that of drive 80. The peripheral raised portions 202 and 203, on wheels 200 and 201 respectively, extend circumferentially for but a few degrees of arc, and are mutually interrelated in accordance with an arbitrary coded sequence, which is peculiar to the transmitting aircraft. A pair of brushes 204 and 205 are provided which are normally out of contact with wheels 202 and 203, but which are so located that upon passage of projections 202 and 203 under brushes 204 or 205 respectively, contact is made, grounding leads 46 or 47, as the case may be, and thereby energizing relay 44 or 45, as the case may be, in a coded sequence, determined by the spacing and character of the projections 202 and 203. The spacing and character of projections 202 and 203 may be individual to each of the telemetric transmitters of the system, and hence may identify the associated aircraft, the energizations of relays 44 and 45 in coded sequence providing like coded deviations of the altitude line specific to the transmitting aircraft. Reference numeral 207 (Figure 3) denotes the character of one aircraft identifying record, as provided by the invention.

It will be clear, since the characters of range and azimuth representative recordings are similar to the characters of identification recordings, that confusion between the two may on rare occasions arise by reason of coincidence of records having different significances. Such occurrences will be rare, however, and non-repetitive due to the lack of synchronism between the rate at which identifying signals are provided and that at which range and azimuth representative signals are provided.

As an alternative method of aircraft identification I may provide a clock driven cam 208, which cams open in coded sequence a circuit maker and breaker 209, located in series with the lead 210, which connects the selective switch arm 43 with pulser 2. When the alternative method of coding transmissions is utilized the various records provided on record receiving surface 34 may be identified in terms of coded breaks 207a in the record line. Identification representative interruptions of transmission may be provided at relatively long intervals, to minimize interference with telemetric transmissions.

The invention, further, may be applied to uses other than telemetric recording of altitude, range and bearing, by replacing the aneroid cell 3 and the specific meters 90 and 90', or any one of them, with devices for measuring other quantities than altitude, range and bearing, respectively.

Accordingly, while I have described and illustrated one specific embodiment of my invention, as required by the pertinent statutes relating to patents of the United States, it will be clear to persons skilled in the telemetric arts that various uses may be found for the invention, and that various modifications of the general arrangement disclosed, as well as of various details thereof, may be resorted to without departing from the true spirit and scope of the invention, as defined in the appended claims.

What I claim and desire to secure by Letters Patent of the United States is:

1. In combination, a transmitter of discrete pulses, means for modulating the timing of said pulses in accordance with the value of a first measurable quantity, and means for further modulating the timing of selected ones of said pulses, selection being accomplished in accordance with the value of a further measurable quantity.

2. A telemetric recording system comprising means for transmitting pulses having pulse time positions characteristic representative of the value of a first measurable quantity and means for modifying said pulse time positions at intervals timed in accordance with the values of a further measurable quantity.

3. A telemetric system comprising a transmitter for transmitting a carrier, means for augmenting the magnitude of said carrier at time positions determined by the value of a first measurable quantity, and means for varying said time positions at times representative of the value of a further measurable quantity.

4. A telemetric system in accordance with claim 3 and further comprising a recorder having periodic line scanning marking means and a time fed record receiving surface, means for synchronizing said line scanning means with said means for augmenting, means for actuating said recorder to create marks on said record receiving surface at times corresponding with the time positions of augmentation of said carrier, and means for correlating time feed of said record receiving surface with operation of said means for varying.

5. A telemetric system comprising means for transmitting a pulsed carrier having a distinguishable characteristic representative of the value of a first measurable quantity, and means for modulating said distinguishable characteristic at intervals representative of the value of a second quantity, a remote recording means having means for interpreting and providing a record of the value of said first measurable quantity, said recorder being adapted and arranged for modulating said record in accordance with the value of said second measurable quantity.

6. A telemetric system comprising a transmitter for transmitting a carrier modulated at times representative of a value of a first quantity, and means for altering the timing of the modulation of said carrier at intervals timed in accordance with a further measurable quantity, a recorder having a line scanning marking means and a time fed record receiving surface, means for actuating said recorder to provide substantially continuous marks on said surface at lateral locations thereof representative of values of said first quantity, and for providing modulations of said marks at longitudinal locations representative of the value of said further measurable quantity.

7. In combination, a transmitter, means for periodically time position modulating said transmitter in accordance with altitude of an elevated object, means for further time position modulating said transmitter periodically at predetermined times in a further and different time cycle, and means for determining said predetermined times in accordance with the value of a measurable quantity.

8. The combination in accordance with claim 7 wherein said measurable quantity is a navigational parameter associated with said elevated object.

9. In combination, a pulse transmitter having pulse time position modulating means, means for controlling said modulating means in accordance with the value of a measurable quantity, means for varying the pulse time positions of pulses controlled by said means for controlling, a meter having a positionable pointer, means for scanning a range of positions of said pointer for discovery of the position of said pointer, and means responsive to discovery of the position of said pointer for actuating said means for varying.

10. The combination in accordance with claim 9 and further comprising a recorder having a laterally line scanning marker and a longitudinally time fed record receiving strip, means for synchronizing the time feed of said strip with the scanning action of said means for scanning a range of positions, and means responsive to said transmitted signals for actuating said marker at positions laterally of said record receiving surface corresponding with pulse time positions of transmitted pulses.

11. In combination, a pulse time position modulated transmitter, means for controlling the pulse time positions of pulses transmitted by said transmitter in accordance with the value of a measurable quantity, and means for temporarily modifying the time positions of said transmitted pulses at times representative of the value of a further measurable quantity.

12. The combination in accordance with claim 11 wherein said means for modifying comprises means for selectively retarding and advancing said times representative of the value of a further measurable quantity.

13. The combination in accordance with claim 11 and further comprising a recorder for recording time positions of said transmitted pulses.

14. The combination in accordance with claim 13 wherein said recorder comprises a time fed record receiving surface calibrated to enable interpretation of time positions of said transmitted pulses and of times of modification of time positions of said transmitted pulses.

15. In combination, a pulse generator, means comprising an altimeter for establishing time positions of pulse generation of said pulse generator with respect to predetermined periodically repetitive equal time intervals, means comprising a range measuring device for establishing further single time positions with respect to each of further and different predetermined periodically repetitive equal time intervals, and means for further modulating said pulse generator only during said further time positions.

16. In combination, a pulse transmitter, means for establishing first periodic equal time intervals, means for establishing second periodic equal time intervals, means for establishing time positions with respect to one of said periodic equal time intervals for pulses transmitted by said pulse transmitter in accordance with the value of a first predetermined quantity, and means for further time position modulating said pulses at times within said second periodic equal time intervals determined in accordance with the value of a second predetermined quantity.

17. In combination, a pulse generator, means for establishing first periodic timing intervals, means for establishing second periodic timing intervals, said first and second periodic timing intervals being unequal, means for establishing first pulse time positions within said first periodic timing intervals, means for establishing second and third pulse time positions within said second periodic timing intervals, means for actuating said pulse generator for generating pulses during said first pulse time positions, and means for differently further modulating the timing of the generated pulses during each of said second and third pulse time positions respectively.

18. In combination, a pulse generator, means for establishing first periodic timing intervals, means for establishing second periodic timing intervals, said first and second timing intervals being unequal, means for establishing first pulse time positions within said first periodic timing intervals, means for establishing second pulse time positions within said second periodic timing intervals, means for activating said pulse generator for generating pulses during said first pulse time positions, and means for modulating the timing of the generated pulse only during said second pulse time positions.

19. In combination in a telemetric system, a plurality of relatively remote stations, means for establishing first periodic timing intervals for all said stations, means for establishing second relatively remote timing intervals for all said stations, said first and second timing intervals being unequal, means for establishing first pulse time positions within said first periodic timing intervals independently at each of said stations, means for establishing second pulse time positions within said second periodic timing intervals independently at each of said stations, a pulse generator at each of said stations, means for activating said pulse generators at each station for generating pulses during said first pulse time positions at that station, means for modulating the timing of the pulses generated at each station only during the second pulse time positions at the station, and means for commonly receiving and visually indicating the time positions of all said generated pulses with respect to both said first and second periodic timing intervals.

20. In combination, a pulse generator, means comprising an altimeter for establishing time positions of pulse generation with respect to predetermined periodically repetitive equal time intervals, means comprising a bearing measuring device for establishing further time positions with respect to further and different predetermined periodically repetitive equal time intervals, and means for further modulating the output of said pulse generator only during said further time positions.

21. In combination, a pulse generator, means comprising an altimeter for establishing time positions of pulse generation with respect to predetermined periodically repetitive equal time intervals, means comprising a range measuring device for establishing further time positions with respect to further and different predetermined periodically repetitive equal time intervals, means comprising a bearing determining device for establishing further time positions with respect to said further and different predetermined periodically repetitive equal time intervals, and means for further distinguishably modulating the output of said pulse generator during said respective further time positions.

22. In combination, means for transmitting periodic pulses, means for establishing first periodic time intervals, means for establishing second periodic time intervals, means for determining the time positions of said periodic pulses with respect to said first periodic time intervals, means for deviating said time positions of said periodic pulses at predetermined time positions with respect to said second periodic time intervals, a visual indicator having means for establishing visual indications having positions simultaneously with respect to a pair of coordinates, and means responsive to said periodic pulses for controlling said visual indicator to provide an indication of the time positions of said pulses with respect to said first and second periodic time intervals simultaneously in terms of positions of said visual indications with respect to both said coordinates.

23. In combination, a remote source of first synchronizing signal, a remote source of second synchronizing signal, local means responsive to said first synchronizing signal for establishing first periodic time intervals, local means responsive to said source of second synchronizing signal for establishing second periodic time intervals, means for generating pulses having predetermined time positions with respect to said first periodic time intervals, and means for modifying said pulses at predetermined time positions with respect to said second periodic time intervals.

24. The combination in accordance with claim 23 wherein is further provided a visual indicating station comprising a marker and a record receiver, means for establishing relative motion between said marker and said record receiver in two coordinate directions in response to said first and second synchronizing signals respectively, and means responsive to said pulses for activating said marker to create a visual indication.

References Cited in the file of this patent

UNITED STATES PATENTS

| Number | Name | Date |
| --- | --- | --- |
| 1,928,969 | Kuffel | Oct. 3, 1933 |
| 2,125,491 | Dean | Aug. 2, 1938 |
| 2,252,083 | Luck | Aug. 12, 1941 |
| 2,378,604 | Wallace | June 19, 1945 |
| 2,380,520 | Hassler | July 31, 1945 |
| 2,396,955 | Lange | Mar. 19, 1946 |
| 2,400,828 | Keinath | May 21, 1946 |
| 2,403,603 | Korn | July 9, 1946 |
| 2,404,571 | Finch | July 23, 1946 |
| 2,418,836 | Hawes | Apr. 15, 1947 |
| 2,419,292 | Shepard | Apr. 22, 1947 |
| 2,468,045 | Deloraine | Apr. 26, 1949 |
| 2,504,126 | Howe | Apr. 18, 1950 |
| 2,521,881 | Suomi | Sept. 12, 1950 |
| 2,524,832 | Poylo | Oct. 10, 1950 |
| 2,535,107 | Wallace | Dec. 26, 1950 |

OTHER REFERENCES

Fidelman, "Electronic Applications in Meteorology," in Radio News, Engineering Dept. May 1946, pages 36–38.